(12) United States Patent
Tsirukis et al.

(10) Patent No.: US 6,790,428 B2
(45) Date of Patent: Sep. 14, 2004

(54) PROCESS FOR THE REDUCTION OR ELIMINATION OF $NH_3$/HF BYPRODUCT IN THE MANUFACTURE OF NITROGEN TRIFLUORIDE

(75) Inventors: Athanasios Tsirukis, Allentown, PA (US); John Theodore Lileck, Tamaqua, PA (US); Howard Paul Withers, Jr., Breinigsville, PA (US); Kenneth E. Fegley, Lehighton, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 235 days.

(21) Appl. No.: 10/102,488

(22) Filed: Mar. 20, 2002

(65) Prior Publication Data

US 2003/0180211 A1 Sep. 25, 2003

(51) Int. Cl.[7] .............................. C01B 7/19; C01B 21/06
(52) U.S. Cl. ........................................ 423/483; 423/406
(58) Field of Search ................................. 423/406, 409, 423/470, 471, 483, 484

(56) References Cited

U.S. PATENT DOCUMENTS

| 4,091,081 A | | 5/1978 | Woytek et al. |
| 4,543,242 A | * | 9/1985 | Aramaki et al. ............ 423/406 |
| 5,637,285 A | * | 6/1997 | Coronell et al. ............ 423/406 |
| 6,183,713 B1 | * | 2/2001 | Tokunaga et al. ........... 423/406 |

OTHER PUBLICATIONS

Robert D. Euler, et al, "Phase Behavior and Thermal Properties of the System NH4F–HF", J. of Phy. Chem., Aug. 1961, P. 1291–1296, Amer. Chem. Soc., vol. 65.

* cited by examiner

*Primary Examiner*—Stanley S. Silverman
*Assistant Examiner*—Manibel Medina
(74) *Attorney, Agent, or Firm*—Geoffrey L. Chase

(57) ABSTRACT

A process for reducing or eliminating $NH_3$/HF/MFz liquid waste melt in the manufacture of $NF_3$ is provided which includes the steps of providing an $NF_3$ reactor for a reaction of $F_2$ with a liquid $NH_3$/HF/MFz mixture that produces $NF_3$, HF, $N_2$ and other nitrogen fluorides as gaseous products and a liquid $NH_3$/HF/MFz mixture as the liquid waste melt. The process further provides for reduction or elimination of the liquid $NH_3$/HF/MFz waste melt produced by the reactor.

27 Claims, 5 Drawing Sheets

PROCESS FOR THE REDUCTION OR ELIMINATION OF NH₃/HF BYPRODUCT IN THE MANUFACTURE OF NITROGEN TRIFLUORIDE

BACKGROUND OF THE INVENTION

The present invention is directed to the manufacture of nitrogen trifluoride ($NF_3$) In particular, the present invention is directed to a process for the reduction or elimination of liquid $NH_3/HF$ byproduct during the manufacture of $NF_3$.

The reaction of fluorine ($F_2$) with liquid $NH_3/HF$ mixtures (or $NH_3/HF/MFz$ mixtures, where M is defined below) produces, $NF_3$, HF, $N_2$ and other nitrogen fluorides as gaseous products and a liquid $NH_3/HF$ mixture (or $NH_3/HF/MFz$ mixture) as a waste byproduct (the liquid waste melt). The objective of the present invention is to provide a means of eliminating the liquid waste melt produced by the reaction in a reactor. The amount of waste produced per amount of $NF_3$ product varies with the reaction conditions, i.e., pressure, temperature and the molar ratio of HF to $NH_3$ (melt ratio).

U.S. Pat. No. 5,637,285 (Coronell et al.) is directed to a method for the synthesis of $NF_3$ from elemental $F_2$ and a source of $NH_3$ in a gas-liquid reaction comprising $3F_2 + NH_4H_{(x-1)}Fx \rightarrow NF_3 + (3+x)HF$ wherein the melt ratio, $HF/NH_3$, represented in the formula, is at least 2.55 and the reaction liquid is agitated or mixed with a mixing apparatus at a high level equivalent to or greater than 1000 watts per cubic meter. This method allows for nitrogen trifluoride yields of 70% or greater. According to Table 6 in this patent, the amount of waste melt (in pounds) generated per pound of $NF_3$ produced can be as low as 1.47 or as high as 3.5.

The existing technology provides no means of controlling or eliminating the production of liquid waste melt. Until now, the liquid waste melt was either wasted or sold as a low-quality F source.

As indicated above, the reaction of $F_2$ with liquid $NH_3/HF$ (or $NH_3/HF/MFz$) mixtures produces $NF_3$, $N_2$, nitrogen fluorides and HF as a byproduct. Some of the byproduct HF escapes with the gaseous products, while the rest is bound by the liquid waste melt in the liquid phase, accumulating in the reactor. The amount of HF escaping with the gaseous products and thus the amount of HF accumulating in the liquid phase is a function of HF vapor pressure above the melt. Filliaudeau and Picard, "Temperature Dependence of the Vapor Pressures and Electrochemical Windows of the $NH_4HF_2$-HF Mixtures," *Materials Science Forum* 73, 669 (1991) provides a relationship that describes the melt HF vapor pressure as a function of temperature and melt ratio. U.S. Pat. No. 5,637,285 (see above) suggests that the reactor process conditions, i.e., agitation, pressure, temperature, vapor and liquid compositions (including melt ratio,) are controlled to optimize $F_2$ conversion and $NF_3$ production yield.

To compensate for the amount of byproduct HF accumulating in the liquid phase and to achieve a constant melt ratio in the reactor, common practice dictates the addition of excess $NH_3$ into the melt, above that required by the $NF_3$ reaction stoichiometry. The excess $NH_3$ binds the byproduct HF that accumulates in the liquid phase and creates excess liquid waste melt, which must be removed.

In Euler and Westrum, "Phase Behavior and Thermal Properties of the System $NH_4F$-HF, *J. Phys. Chem.* 65, 1291 (1961), the system $NH_4F$-HF was studied by thermal analysis between the limits $NH_4HF_2$ and HF. Euler and Westrum show that $NH_3$ and HF molecules interact strongly, producing mixtures that are liquid at temperatures well above the boiling points of either pure compound. This property makes pervaporation a feasible means of separating pure HF from the melt in accordance with two of the preferred embodiments of the present invention, as described below.

BRIEF SUMMARY OF THE INVENTION

Processes for reducing or eliminating $NH_3/HF$ or $NH_3/HF/MFz$ liquid waste melt in the manufacture of $NF_3$ are provided. All preferred embodiments include the step of providing an $NF_3$ reactor for a reaction of $F_2$ with a liquid $NH_3/HF$ or $NH_3/HF/MFz$ mixture that produces $NF_3$, HF, $N_2$ and other nitrogen fluorides as gaseous products and a liquid or $NH_3/HF$ or $NH_3/HF/MFz$ mixture as the liquid waste melt. For purposes of the present invention, $NH_3/HF/MFz$ mixture is an ammonium complex selected from the group consisting of $NH_4H_{(x-1)}F_x$, $(NH_4)_yMFz.nHF$, and mixtures thereof, where x is equal to or greater than 2.55, y is 1–4, z is 2–8, n is sufficient at reaction conditions to maintain the ammonium complex substantially as a liquid, and M is selected from the group of elements from Group IA through VA, Group IB through VIIB and Group VIII of the Periodic Table of the Elements. Additionally, for purposes of the present invention, the mixture $NH_3/HF/MFz$ may include only a mixture of $NH_3/HF$. HF is transferred from the liquid waste melt into a gas liquid or solid medium from which HF can be separated to produce a liquid waste melt that is substantially stripped of HF. The stripped liquid waste melt is transferred back to the reactor. The HF is preferably separated and purified and reused, possibly in an $F_2$ production process.

In a first embodiment, a stripping gas is controllably added to the liquid waste melt to yield a saturated stripping gas mixture that is saturated with HF that has been removed from the liquid $NH_3/HF/MFz$ waste mixture and a stripped liquid waste melt. Flow of the stripping gases is metered such that the amount of HF removed by the stripping gases from the liquid waste melt is controlled. The stripping gas may preferably be $N_2$ or $NF_3$ or may also be Ar, He, Ne, $N_2$ and $NF_3$ and the like, but may not include adding $NH_3$ or HF. The process may include the step of transferring the liquid waste melt into an auxiliary stripping vessel prior to the step of adding the stripping gas and may also include the step of exhausting the stripping gas from the stripping vessel whereby the stripping gas is saturated with HF. HF may be separated from the saturated stripping gas mixture and purified and used for $F_2$ production. Purification may be accomplished, for example, by condensation, distillation, adsorption, absorption, or membrane separation. The step of transferring the stripped liquid waste melt from the stripping vessel back into the $NF_3$ reactor may also be included.

In a second embodiment, the liquid waste melt may be transferred from the $NF_3$ reactor into a heat exchanger, where heat is added to the liquid waste melt. The heated liquid waste melt is transferred into a phase separation vessel, which separates the liquid waste melt into a liquid phase product and a vapor phase product. The liquid phase product is cooled in a cooler, and returned to the reactor. The vapor phase product consists of a high percentage HF. The vapor phase product of HF may be purified to yield substantially pure HF and be used for $F_2$ production. The step of purifying the vapor phase product may be accomplished by, for example, condensation, distillation, adsorption, absorption, or membrane separation.

In a third embodiment, the liquid waste melt may be transferred from the $NF_3$ reactor into a pressure controllable vessel where pressure in the vessel is controlled to allow the liquid waste melt to separate into a liquid phase product and a vapor phase product. The liquid phase product may be returned to the reactor, whereby the vapor phase product consists of a high percentage of HF. The process may include the step of purifying the vapor phase product of HF to yield substantially pure HF. The purified HF may be used for $F_2$ production. The step of purifying the vapor phase product may be accomplished by, for example, condensation, distillation, adsorption, absorption, or membrane separation.

In a fourth embodiment, liquid waste melt may be forced through a membrane that selectively allows the passage of HF but not of $NH_3$/HF/MFz complexes, wherein liquid that does not pass through the membrane is added back to the $NF_3$ reactor and liquid that passes through the membrane is substantially pure HF. A step of further purifying the HF that has passed through the membrane may be included. The process may also include the step of using the purified HF for $F_2$ production. The step of further purifying the HF that has passed through the membrane may be accomplished by, for example, condensation, distillation, adsorption, absorption, or membrane separation.

In a fifth embodiment, the process includes the step of absorbing HF from the liquid waste melt using an absorption medium. The process may also include extracting and purifying the HF from the absorption medium. The step of purifying the HF may be accomplished by, for example, condensation, distillation, adsorption, absorption, and membrane separation. The absorption medium may be, for example, metal fluoride/HF complexes (MFz/HF). The step of absorbing HF from the liquid waste melt using an absorption medium may include providing an HF transfer device wherein liquid waste melt is transferred from the $NF_3$ reactor into the HF transfer device in a waste melt stream and wherein the absorption medium is introduced into the HF transfer device in an absorption medium stream, wherein temperatures of the two streams are maintained so that the vapor pressure of the waste melt stream is greater than the vapor pressure of the absorption medium stream. HF will be transferred from the waste melt stream into the absorption medium stream to produce an absorption medium mixture stream. The absorption medium mixture stream may be used for $F_2$ production. The stripped liquid waste melt stream may be returned to the reactor. The HF transfer device may include, for example, two tanks that have connected vapor spaces. Alternatively, the HF transfer device may include, for example, a membrane that allows for passage of HF but not of $NH_3$/HF/MFz.

Finally, a sixth embodiment of the present invention may use a combination of the above five embodiments with optimization of the system. The first through fifth embodiments can be combined, optimized and operated so as to achieve transfer of HF from the liquid waste melt into a solid, liquid or gaseous medium, from where HF can be easily recovered, purified and reused, possibly in an $F_2$ production facility.

DETAILED DESCRIPTION OF THE INVENTION

Figure 1:
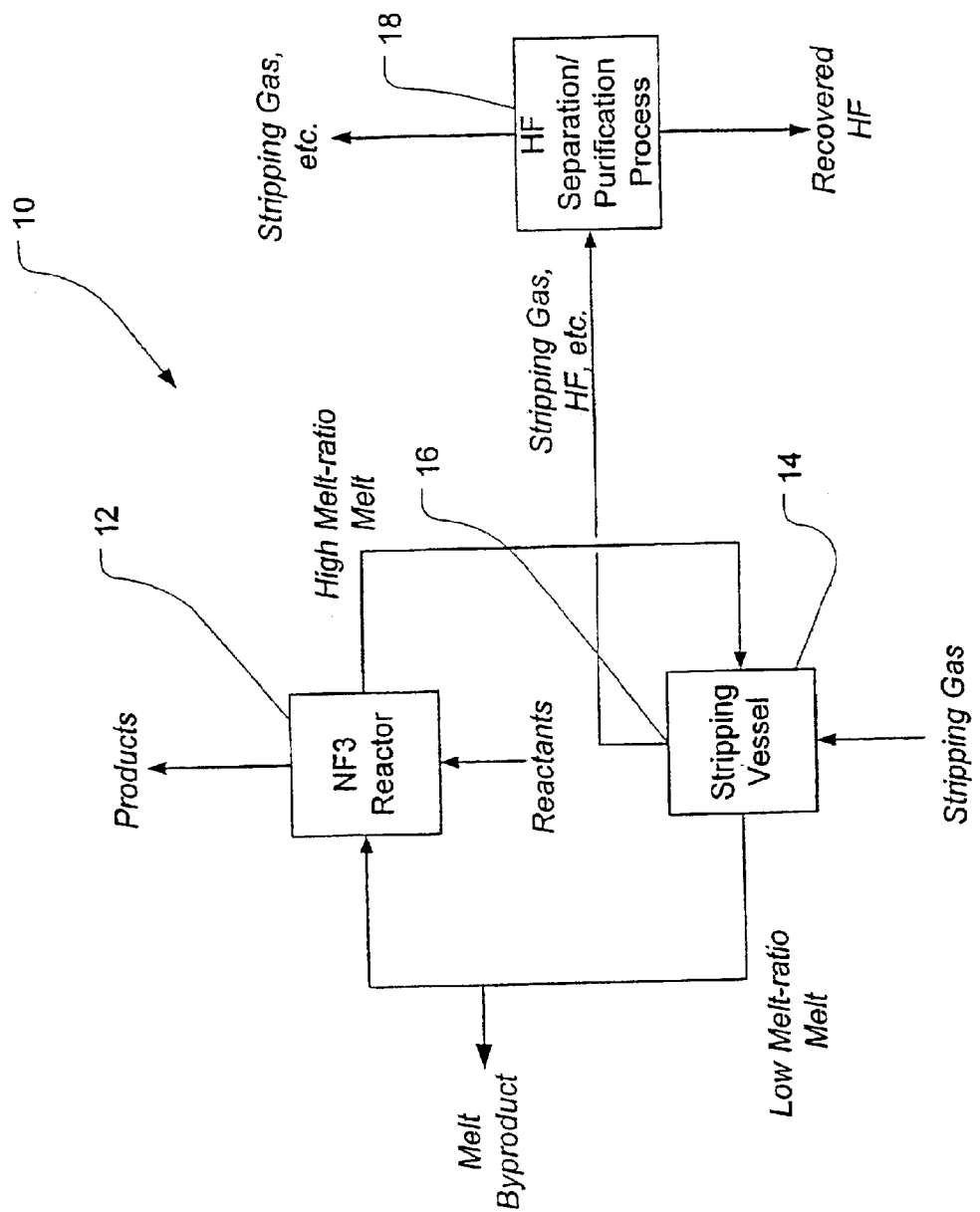
FIG. 1 is a schematic diagram of a process for reducing or eliminating liquid $NH_3$/HF/MFz waste melt in the manufacture of $NF_3$ in accordance with a first preferred embodiment of the present invention.

The manufacture of $NF_3$ is based on the reaction of $F_2$ with liquid $NH_3$/HF/MFz mixtures. The reaction produces $NF_3$, HF, $N_2$ and other nitrogen fluorides as gaseous byproducts, as well as a liquid $NH_3$/HF/MFz waste melt. The present invention improves the current method of manufacturing $NF_3$ by providing a process that reduces or eliminates the production of this excess $NH_3$/HF/MFz liquid waste. Again, for purposes of the present invention, $NH_3$/HF/MFz mixture is an ammonium complex selected from the group consisting of $NH_4H_{(x-1)}F_x$, $(NH_4)_y MFz.nHF$ and mixtures thereof where x is equal to or greater than 2.55, y is 1–4, z is 2–8, n is sufficient at reaction conditions to maintain the ammonium complex substantially as a liquid, and M is selected from the group of elements from Group IA through VA, Group IB through VIIB and Group VIII of the Periodic Table of the Elements. Additionally, for purposes of the present invention, the mixture $NH_3$/HF/MFz may include only a mixture of $NH_3$/HF.

This invention presents a process that provides for the reduction, in a controlled manner, or even the elimination of the production of excess $NH_3$/HF/MFz liquid waste, i.e., the liquid waste melt. The process is based on the continuous or intermittent transfer of HF from the liquid waste melt into any other gas, liquid or solid medium, from which HF can be easily separated, purified and reused, possibly in the $F_2$ production facility. The transfer can be achieved by any feasible unit operation, a number of which are suggested below. Preferably, in the present invention, HF is transferred outside the $NF_3$ production reactor, in a suitable processing vessel, by continuous or batch re-circulation of liquid waste melt between the reactor and a processing vessel. This is to ensure that the reactor process conditions, i.e., agitation, pressure, temperature, vapor and liquid compositions (including melt ratio), which are set to optimize the $NF_3$ production reaction, will not be affected by efforts to minimize liquid waste melt. Additionally, liquid waste melt recirculation provides for introduction of some of the required raw materials in the liquid waste melt and for cooling of the mixture outside the reactor, thereby reducing the cooling load imposed on the reactor cooling system.

The amount of HF removed from the liquid waste melt (i.e., stripped HF) can be less than, equal to, or greater than the amount of reaction byproduct HF accumulated in the liquid waste melt. If it is desired to completely eliminate the amount of liquid waste melt, the process can be controlled so that the amount of stripped HF is equal to the amount of HF byproduct. No excess $NH_3$ (or MFz) is needed to maintain a constant melt ratio in the reactor. Alternatively, it may be desirable to reduce, but not completely eliminate, the amount of liquid waste so as to provide an outlet for unwanted impurities that may accumulate in the liquid waste melt. The process can be controlled so that the amount of stripped HF is arbitrarily less than the amount of HF byproduct. In this case, HF will accumulate in the liquid phase and addition of $NH_3$ (and $MF_z$, if appropriate) in excess of that required by the $NF_3$ reaction stoichiometry will be used to maintain a constant melt ratio in the reactor. If the amount of stripped HF is greater than the amount of HF byproduct, then additional HF must be added in the liquid waste melt to maintain a constant melt ratio in the reactor.

The following presents a number of different unit operations that can be utilized to transfer HF from the liquid waste melt to another gas, liquid or solid compound, from which HF can be easily separated, purified and reused, possibly in an $F_2$ production facility.

The first embodiment of a process for reducing or eliminating $NH_3/HF/MFz$ waste melt in the manufacture of $NF_3$ 10 in accordance with the present invention utilizes stripping gases to remove HF from the liquid $NH_3/HF/MFz$ waste mixture. In the process depicted in FIG. 1, liquid waste melt is transferred from the reactor 12 into an auxiliary stripping vessel 14, where a gas other than $NH_3$ or HF, i.e., the stripping gas, is added. While any gas which does not react with the liquid waste melt, $F_2$, $NF_3$ or the other fluorinated reaction byproducts can be used as a stripping gas, such as Ar, He, Ne, and the like, the preferred stripping gases are $N_2$ and $NF_3$. The stripping gas is exhausted from the stripping vessel vent 16, saturated with HF. By controlling the flow of stripping gases added to the liquid waste melt in the stripping vessel 16, the amount of HF removed by the stripping gases from the liquid waste melt is controlled. HF can be separated from the stripping gas mixture (i.e., the stripping gas saturated with HF) and may be then purified by a variety of unit operations (e.g., by condensation, distillation, adsorption, absorption, membrane separation, etc,) in a process 18 and reused, possibly in an $F_2$ production process. The stripped liquid waste melt is transferred from the stripping vessel 14 back into the reactor 12.

Figure 2:
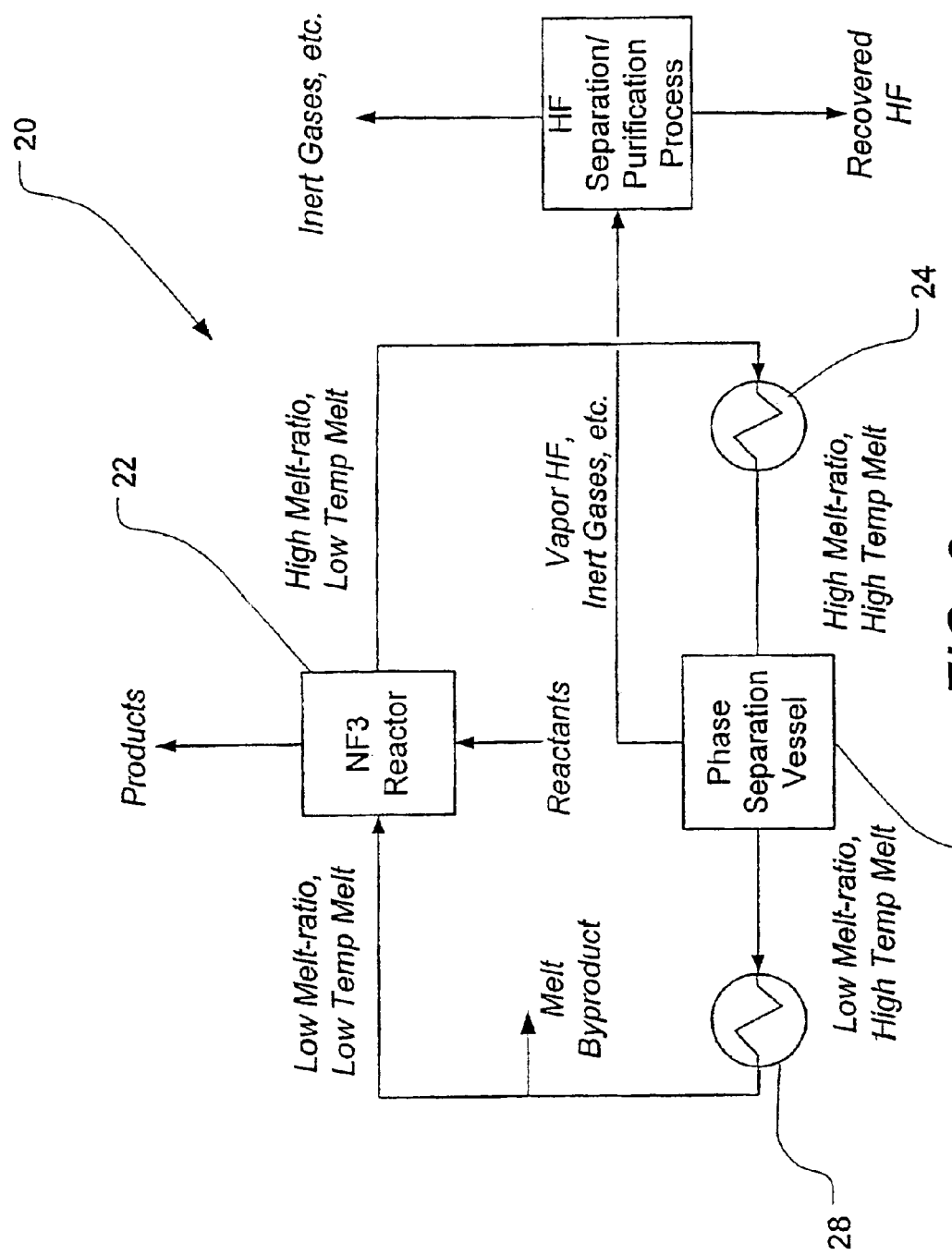
FIG. 2 is a schematic diagram of a process for reducing or eliminating liquid $NH_3$/HF/MFz waste melt in the manufacture of $NF_3$ in accordance with a second preferred embodiment of the present invention.

The second embodiment of a process for reducing or eliminating $NH_3/HF/MFz$ waste melt in the manufacture of $NF_3$ 20 in accordance with the present invention involves the manipulation of temperature to remove HF from a liquid $NH_3/HF/MFz$ mixture. Filliaudeau and Picard (see above) show that for a given melt ratio, the HF vapor pressure of the melt increases with temperature. For a given pressure and melt ratio there exists a temperature melt HF boiling point at which the vapor pressure of HF is equal to the total pressure. If the melt temperature is maintained at the melt HF boiling point, then any additional heat supplied in the melt will produce HF vapor. Therefore, by controlling the amount of heat supplied to the liquid waste melt, we can control the amount of HF vaporized from the liquid waste melt. The process 20 is shown in FIG. 2. Liquid waste melt is transferred from the reactor 22 into a heat exchanger 24, where the appropriate amount of heat is added to the liquid waste melt. The heated liquid waste melt is then transferred into an auxiliary phase separation vessel 26, where the liquid waste melt is allowed to separate into two phases, a liquid phase and a vapor phase. The liquid phase, which has a melt ratio less than that of the liquid waste melt, is cooled in cooler 28 and returned to the reactor 22. The vapor phase, which consists mainly of HF, can be further processed, purified and recycled for $F_2$ production, as described above with respect to the first process 10.

Figure 3:
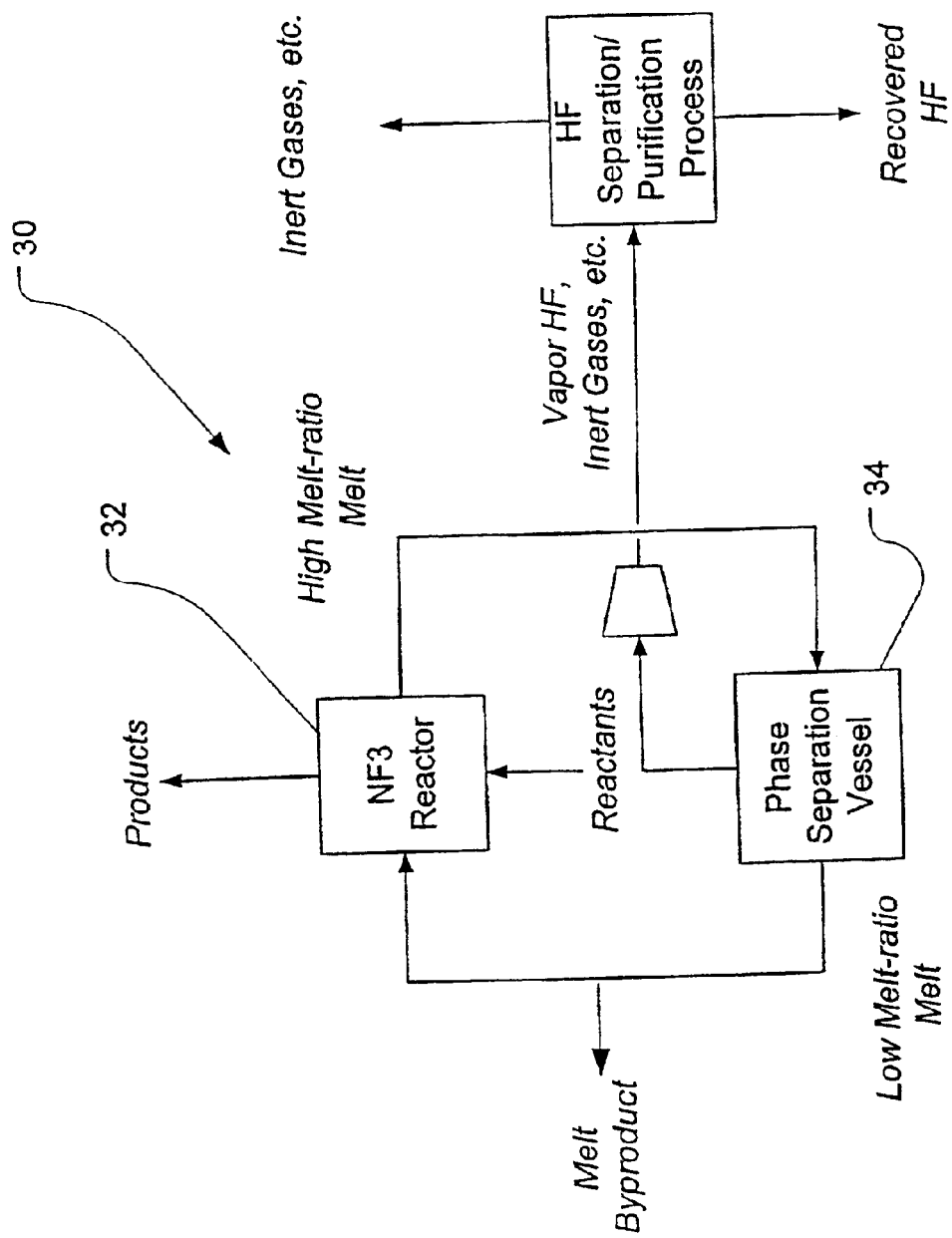
FIG. 3 is a schematic diagram of a process for reducing or eliminating liquid $NH_3$/HF/MFz waste melt in the manufacture of $NF_3$ in accordance with a third preferred embodiment of the present invention.

The third embodiment of a process for reducing or eliminating or $NH_3/HF/MFz$ waste melt in the manufacture of $NF_3$ 30 in accordance with the present invention involves manipulating pressure to remove HF from a liquid $NH_3/HF/MFz$ mixture. Filliaudeau and Picard (see above) show that the melt HF vapor pressure is a function of temperature and melt ratio. For a given temperature and melt ratio, HF can be vaporized from the melt if the total pressure above the liquid waste melt is maintained at less than or equal to the liquid waste melt HF vapor pressure. Therefore, by controlling the total pressure above the liquid waste melt the amount of HF vaporized from the liquid waste melt can be controlled. The process 30 is shown in FIG. 3. Liquid waste melt is transferred from the reactor 32 into an auxiliary vessel 34, where the pressure is controlled at the appropriate level. The liquid waste melt is allowed to separate in two phases, a liquid phase and a vapor phase. The liquid phase, which has a melt ratio less than that of the liquid waste melt, is returned to the reactor 32. The vapor phase, which consists mainly of HF, can be further processed, purified and recycled for $F_2$ production.

Figure 4:
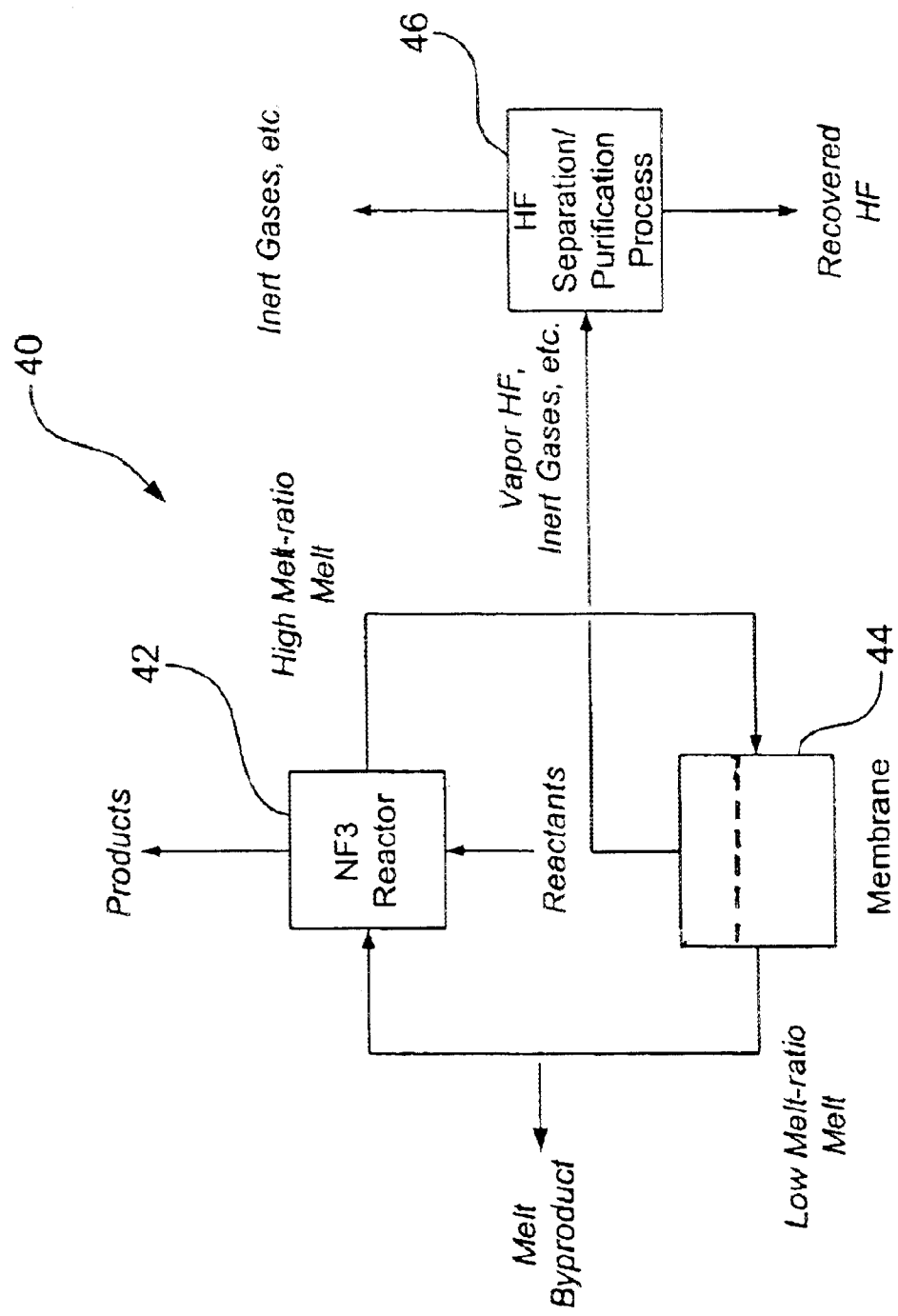
FIG. 4 is a schematic diagram of a process for reducing or eliminating liquid $NH_3$/HF/MFz waste melt in the manufacture of $NF_3$ in accordance with a fourth preferred embodiment of the present invention.

The fourth embodiment of a process for reducing or eliminating $NH_3/HF/MFz$ waste melt in the manufacture of $NF_3$ 40 in accordance with the present invention uses pervaporation to remove HF from a liquid $NH_3/HF/MFz$ mixture. Euler and Westrum (see above) show that $NH_3$ and HF molecules interact strongly, producing mixtures that are liquid at temperatures well above the boiling points of either pure compound. This property makes pervaporation a feasible means of separating pure HF from the liquid waste melt. The process 40 is shown in FIG. 4. The liquid waste melt exits the $NF_3$ reactor 42 and is forced through an appropriately designed membrane 44 that selectively allows the passage of HF but not of $NH_3/HF/MFz$ complexes. The liquid that does not pass through the membrane 42 (the retentate) exits from the module and is recycled in the $NF_3$ reactor, whereas the liquid that passes through the membrane 44 (the permeate) is pure HF and evaporates. The permeate can be separated and purified in a process 46, as described above, and re-used, possibly in the $F_2$ production process.

The fifth embodiment of a process for reducing or eliminating $NH_3/HF/MFz$ waste melt in the manufacture of $NF_3$ 50 in accordance with the present invention uses absorption to remove HF from a liquid $NH_3/HF/MFz$ mixture. If the liquid waste melt is brought in contact with an appropriate liquid or solid medium (absorption medium) that has a lower HF vapor pressure than the liquid waste melt, then HF will be transferred from the liquid waste melt into the absorption medium, from which HF can be re-recovered and reused, possibly in the $F_2$ production facility. Examples of such media are appropriate metal fluoride/HF complexes, (MFz/HF) such as those used in the electrochemical production of $F_2$, e.g., NaF/HF, KF/HF mixtures (MFz/HF mixtures, where, again, M is selected from the group of elements from Group IA through VA, Group IB through VIIB and Group VIII of the Periodic Table of the Elements). An example of such a process is shown in FIG. 5.

Figure 5:
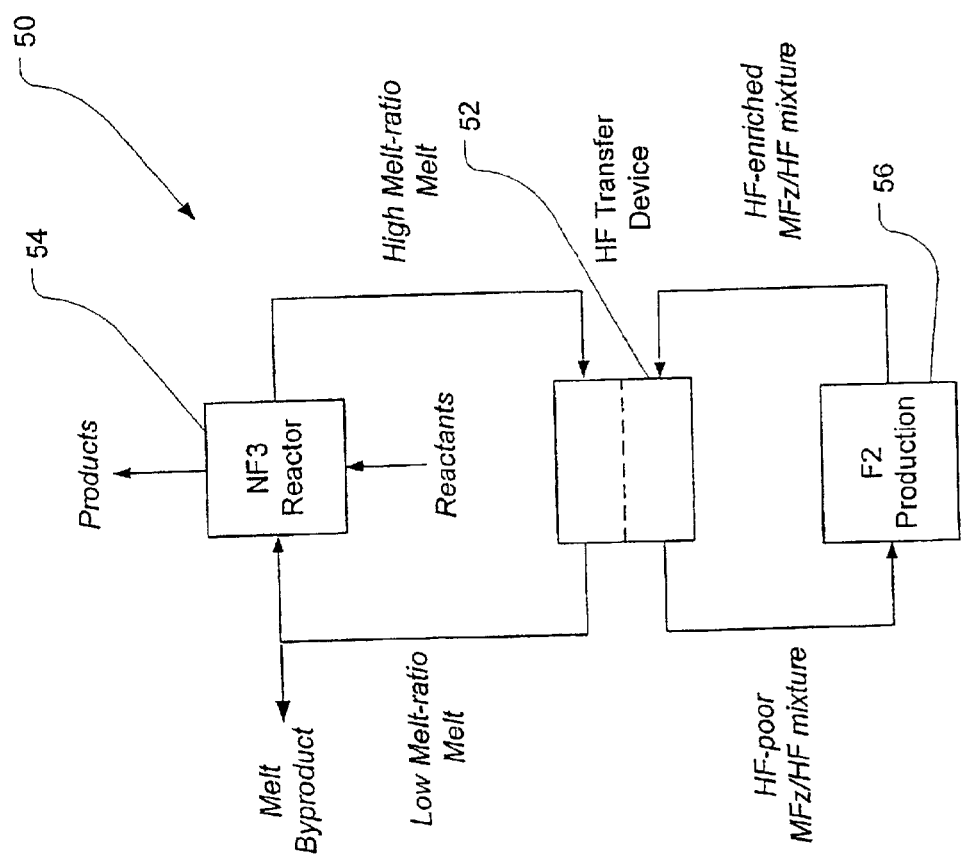
FIG. 5 is a schematic diagram of a process for reducing or eliminating liquid $NH_3$/HF/MFz waste melt in the manufacture of $NF_3$ in accordance with a fifth preferred embodiment of the present invention.

The central unit operation in the process for reducing or eliminating $NH_3/HF/MFz$ waste melt in the manufacture of $NF_3$ 50 of FIG. 5 is the HF transfer device 52, which can utilize any process that allows HF to be transferred from liquid waste melt to the MFz/HF mixture without mixing the two streams. Two examples of such a unit operation are: (i) a membrane similar to the one utilized in the process 40 of FIG. 4 which allows the passage of HF but not of the $NH_3/HF/MFz$ or the MFz/HF complexes, and (ii) two simple tanks whose vapor spaces are connected. Liquid waste melt is transferred from the $NF_3$ reactor into the HF transfer device 52. On the other side of the HF transfer device a MFz/HF mixture is introduced which is used in the electrolytic production of $F_2$. If the temperatures or the two liquid streams are maintained so that the vapor pressure of the liquid waste melt is greater than the vapor pressure of the MFz/HF mixture, then HF will be transferred from the liquid waste melt into the MFz/HF mixture. The stripped liquid waste melt may then be returned to the $NF_3$ reactor 54, and the HF-enriched MFz/HF mixture may be returned into the $F_2$ production facility 56. The recycled HF may be used to produce $F_2$.

The sixth embodiment of a process for reducing or eliminating $NH_3$/HF/MFz waste melt in the manufacture of $NF_3$ in accordance with the present invention uses a combination of the above five embodiments with optimization of the system. The first through fifth embodiments can be combined, optimized and operated so as to achieve transfer of HF from the $NF_3$ reactor liquid waste melt into a solid, liquid or gaseous medium, from where HF can be easily recovered, purified and reused, possibly in the $F_2$ production facility.

The proposed process can significantly reduce or eliminate the liquid waste melt produced by the $NF_3$ production reactor, thus reducing the consumption of raw materials ($NH_3$, HF and MFz, if appropriate) and improving the $NF_3$ production economics. At the same time, the process eliminates a source of hazardous waste from the environment.

Although illustrated and described herein with reference to specific embodiments, the present invention nevertheless is not intended to be limited to the details shown. Rather, various modifications may be made in the details within the scope and range of equivalents of the claims without departing from the spirit of the invention.

We claim:

1. A process for reducing or eliminating $NH_3$/HF/MFz liquid waste melt in the manufacture of $NF_3$, comprising the steps of providing a $NF_3$ reactor for a reaction of $F_2$ with a liquid $NH_3$/HF/MFz mixture that produces $NF_3$, HF, $N_2$ and other nitrogen fluorides as gaseous products and a liquid $NH_3$/HF/MFz mixture as the liquid waste melt, said process further comprising transferring HF from the liquid waste melt into a gas, liquid or solid medium from which HF can be separated to produce a stripped liquid waste melt and transferring the stripped liquid waste melt back to the reactor.

2. The process for reducing or eliminating $NH_3$/HF/MFz liquid waste melt of claim 1, including the step of purifying the separated HF.

3. A process for reducing or eliminating $NH_3$/HF/MFz liquid waste melt in the manufacture of $NF_3$, comprising the steps of providing a $NF_3$ reactor for a reaction of $F_2$ with a liquid $NH_3$/HF/MFz mixture that produces $NF_3$, HF, $N_2$ and other nitrogen fluorides as gaseous products and a liquid $NH_3$/HF/MFz mixture as the liquid waste melt, said process further comprising controllably adding a stripping gas to the liquid waste melt to yield a saturated stripping gas mixture that is saturated with HF that has been removed from the liquid waste melt and a stripped liquid waste melt, whereby flow of the stripping gases is metered such that the amount of HF removed by the stripping gases from the waste melt is controlled.

4. The process for reducing or eliminating $NH_3$/HF/MFz liquid waste melt of claim 3, wherein the step of adding stripping gases includes adding $N_2$.

5. The process for reducing or eliminating $NH_3$/HF/MFz liquid waste melt of claim 3, wherein the step of adding stripping gases includes adding $NF_3$.

6. The process for reducing or eliminating $NH_3$/HF/MFz liquid waste melt of claim 3, including the step of transferring the liquid waste melt into an auxiliary stripping vessel prior to the step of adding the stripping gas and the step of exhausting the stripping gas from the stripping vessel when the stripping gas is saturated with HF.

7. The process for reducing or eliminating $NH_3$/HF/MFz liquid waste melt of claim 3, including the step of separating HF from the saturated stripping gas mixture.

8. The process for reducing or eliminating $NH_3$/HF/MFz liquid waste melt of claim 7, including the step of purifying the separated HF.

9. The process for reducing or eliminating $NH_3$/HF/MFz liquid waste melt of claim 8, including the step of using the purified HF for $F_2$ production.

10. The process for reducing or eliminating $NH_3$/HF/MFz liquid waste melt of claim 3, including the step of transferring the stripped liquid waste melt from the stripping vessel back into the $NF_3$ reactor.

11. A process for reducing or eliminating $NH_3$/HF/MFz liquid waste melt in the manufacture of $NF_3$, comprising the steps of providing a $NF_3$ reactor for a reaction of $F_2$ with a liquid $NH_3$/HF/MFz mixture that produces $NF_3$, HF, $N_2$ and other nitrogen fluorides as gaseous products and a liquid $NH_3$/HF/MFz mixture as the liquid waste melt, said process further comprising transferring the liquid waste melt from the $NF_3$ reactor into a heat exchanger, adding heat to the liquid waste melt to heat the liquid waste melt in the heat exchanger, transferring the heated liquid waste melt into a phase separation vessel, separating the liquid waste melt into a liquid phase product and a vapor phase product in the phase separation vessel, cooling the liquid phase product in a cooler, and returning the liquid phase product to the reactor, whereby the vapor phase product consists of a high percentage HF.

12. The process for reducing or eliminating $NH_3$/HF/MFz liquid waste melt of claim 11, including the step of purifying the vapor phase product of HF to yield substantially pure HF.

13. The process for reducing or eliminating $NH_3$/HF/MFz liquid waste melt of claim 12, including the step of using the purified HF for $F_2$ production.

14. A process for reducing or eliminating $NH_3$/HF/MFz liquid waste melt in the manufacture of $NF_3$, comprising the steps of providing a $NF_3$ reactor for a reaction of $F_2$ with a liquid $NH_3$/HF/MFz mixture that produces $NF_3$, HF, $N_2$ and other nitrogen fluorides as gaseous products and a liquid $NH_3$/HF/MFz mixture as the liquid waste melt, said process further comprising transferring the liquid waste melt from the $NF_3$ reactor into a pressure controllable vessel, controlling pressure in the vessel to allow the liquid waste melt to separate into a liquid phase product and a vapor phase product, and returning the liquid phase product to the reactor, whereby the vapor phase product consists of a high percentage of HF.

15. The process for reducing or eliminating $NH_3$/HF/MFz liquid waste melt of claim 14, including the step of purifying the vapor phase product of HF to yield substantially pure HF.

16. The process for reducing or eliminating $NH_3$/HF/MFz liquid waste melt of claim 15, including the step of using the purified HF for $F_2$ production.

17. A process for reducing or eliminating $NH_3$/HF/MFz liquid waste melt in the manufacture of $NF_3$, comprising the steps of providing a $NF_3$ reactor for a reaction of $F_2$ with a liquid $NH_3$/HF/MFz mixture that produces $NF_3$, HF, $N_2$ and other nitrogen fluorides as gaseous products and a liquid $NH_3$/HF/MFz mixture as the liquid waste melt, said process further comprising forcing the liquid waste melt through a membrane that selectively allows the passage of HF but not of $NH_3/HF/MFz$ complexes, wherein liquid that does not pass through the membrane is added back to the $NF_3$ reactor and liquid that passes through the membrane is substantially pure HF.

18. The process for reducing or eliminating $NH_3/HF/MFz$ liquid waste melt of claim 17, including the step of further purifying the HF that has passed through the membrane.

19. The process for reducing or eliminating $NH_3/HF/MFz$ liquid waste melt of claim 18, including the step of using the purified HF for $F_2$ production.

20. A process for reducing or eliminating $NH_3/HF/MFz$ liquid waste melt in the manufacture of $NF_3$, comprising the steps of providing a $NF_3$ reactor for a reaction of $F_2$ with a liquid $NH_3/HF/MFz$ mixture that produces $NF_3$, HF, $N_2$ and other nitrogen fluorides as gaseous products and a liquid $NH_3/HF/MFz$ mixture as the liquid waste melt, said process further comprising the step of absorbing HF from the liquid waste melt using an absorption medium.

21. The process for reducing or eliminating $NH_3/HF/MFz$ liquid waste melt of claim 20, including the step of extracting and purifying the HF from the absorption medium.

22. The process for reducing or eliminating $NH_3/HF/MFz$ liquid waste melt of claim 21, including the step of using the extracted and purified HF for $F_2$ production.

23. The process for reducing or eliminating $NH_3/HF/MFz$ liquid waste melt of claim 20, wherein the step including use of an absorption medium includes use of an absorption medium selected from the group consisting essentially of metal fluoride/HF complexes, (MFz/HF).

24. The process for reducing or eliminating $NH_3/HF/MFz$ liquid waste melt of claim 20, wherein the step of absorbing HF from the liquid waste melt using an absorption medium includes providing an HF transfer device wherein liquid waste melt is transferred from the $NF_3$ reactor into the HF transfer device in a liquid waste melt stream and wherein an absorption medium is introduced into the HF transfer device in an absorption medium stream, wherein temperatures of the two streams are maintained so that the vapor pressure of the liquid waste melt stream is greater than the vapor pressure of the absorption medium stream, such that HF will be transferred from the liquid waste melt stream into absorption medium stream to produce an absorption medium mixture stream.

25. The process for reducing or eliminating $NH_3/HF/MFz$ liquid waste melt of claim 24, wherein the step of providing the HF transfer device includes providing two tanks that have connected vapor spaces.

26. The process for reducing or eliminating $NH_3/HF/MFz$ liquid waste melt of claim 24, wherein the step of providing the HF transfer device includes providing a membrane that allows for passage of HF but not of $NH_3/HF/MFz$ or MFz/HF complexes.

27. A process for reducing or eliminating $NH_3/HF/MFz$ liquid waste melt in the manufacture of $NF_3$, comprising the steps of providing a $NF_3$ reactor for a reaction of $F_2$ with a liquid $NH_3/HF/MFz$ mixture that produces $NF_3$, HF, $N_2$ and other nitrogen fluorides as gaseous products and a liquid $NH_3/HF/MFz$ mixture as the liquid waste melt, said process further comprising:

(a) controllably adding a stripping gas to a portion of the liquid waste melt to yield a saturated stripping gas mixture that is saturated with HF that has been removed from the liquid waste melt and a stripped liquid waste melt, whereby flow of the stripping gases is metered such that the amount of HF removed by the stripping gases from the liquid waste melt is controlled, and returning the stripped liquid waste melt back to the reactor; and (b) transferring a portion of the liquid waste melt from the $NF_3$ reactor into a heat exchanger, adding heat to the liquid waste melt to heat the liquid waste melt in the heat exchanger, transferring the heated liquid waste melt into a phase separation vessel, separating the liquid waste melt into a liquid phase product and a vapor phase product in the phase separation vessel, cooling the liquid phase product in a cooler, and returning the liquid phase product to the reactor, whereby the vapor phase product consists of a high percentage HF; and (c) transferring a portion of the liquid waste melt from the $NF_3$ reactor into a pressure controllable vessel, controlling pressure in the vessel to allow the liquid waste melt to separate into a liquid phase product and a vapor phase product, cooling the vapor phase product in a cooler, and returning the liquid phase product to the reactor, whereby the vapor phase product consists of a high percentage of HF;

(d) forcing the a portion of the liquid waste melt through a membrane that selectively allows the passage of HF but not of $NH_3/HF/MFz$ complexes, wherein liquid that does not pass through the membrane is added back to the $NF_3$ reactor and liquid that passes through the membrane is substantially pure HF; and (e) absorbing HF from a portion of the liquid waste melt using an absorption medium;

whereby all of the liquid waste melt is processed by any one or more of steps (a) through (e).

* * * * *